Patented Apr. 23, 1929.

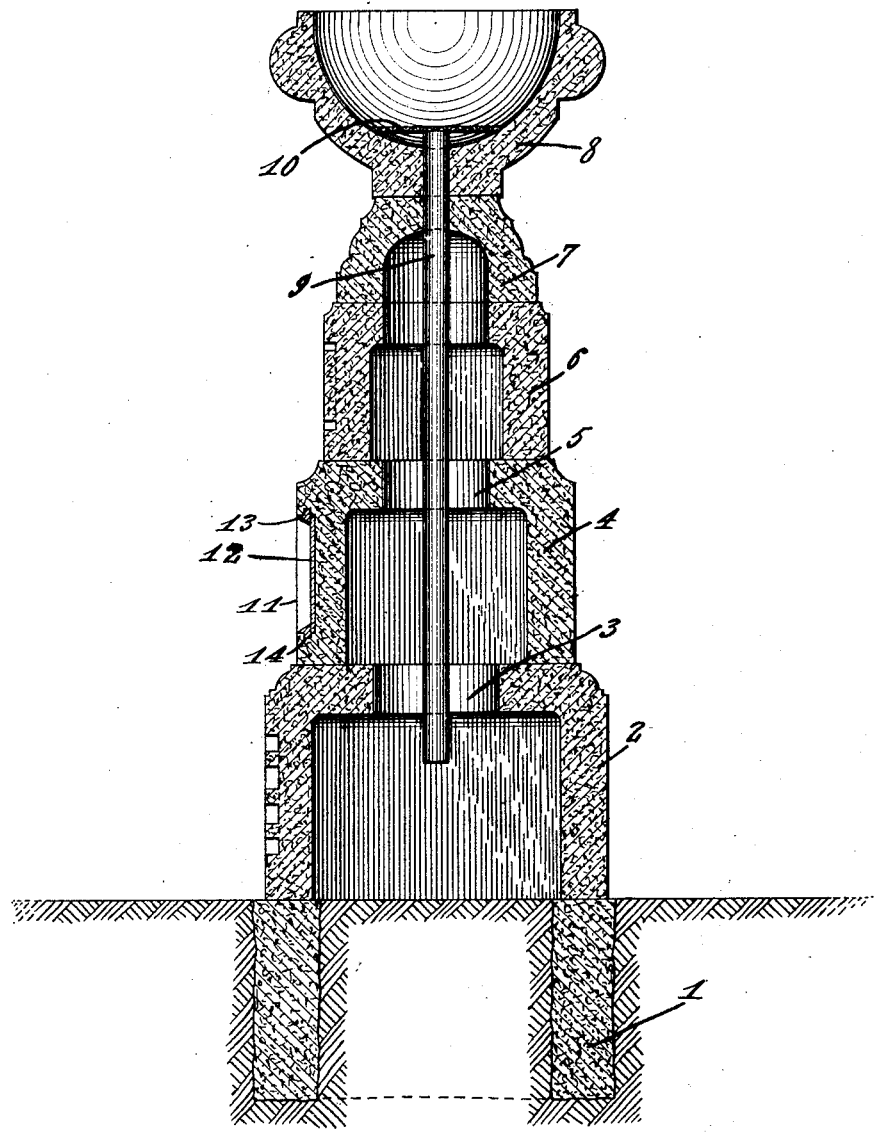

1,710,014

UNITED STATES PATENT OFFICE.

CHARLES C. CROSSLEY, OF STRUTHERS, OHIO.

MONUMENT.

Application filed September 20, 1924. Serial No. 738,915.

This invention relates to a monument of the type designed for use in cemeteries, one of the objects of the invention being to provide a device of this character built of superposed blocks preferably of concrete, said blocks cooperating to form a damp compartment from which moist air can be supplied to the soil contained within a vase or bowl forming a part of the monument.

Heretofore monuments have been provided with bowls for containing soil in which plants have been grown but the drain opening or openings provided for moisture have left this soil dry after the moisture has evaporated. This has been due to the fact that the atmospheric air has been free to circulate through the openings and quickly dry out the dirt and kill the plants unless given constant attention.

An object of the present invention is to provide a solid compartment into which the moisture will drain from the bowl so that the air confined within the compartment will be constantly saturated with moisture and this moisture supplied to the soil in the bowl or vase so that the action will be practically the same as though the soil in the vase were in direct contact with the ground.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing which is a section through the monument, the preferred form of the invention has been shown.

Referring to the figure by characters of reference 1 designates a foundation preferably of concrete extending a suitable distance into the ground and arranged on this foundation is the base block 2 of the monument. This block is preferably formed of concrete and hollow and has an opening 3 in the top thereof communicating with the interior of another hollow block 4. This block in turn has an opening 5 in its top communicating with the interior of another hollow block 6. The base 7 of the bowl or vase 8 is erected on the block 6. This bowl 8 has a pipe 9 secured in the bottom thereof and suspended within and out of contact with the blocks 2, 4 and 6. The upper end of this pipe projects slightly above the bottom surface of the vase or bowl so that a small amount of moisture may be trapped within the structure. A screen 10 is extended over the upper end of the pipe and rests upon the bottom of the bowl or vase so as to prevent dirt from getting into the pipe.

It is to be understood that the blocks forming the monument can be of any suitable size, shape and number. If desired one of the blocks can be formed with a recess 11 for receiving an inscription plate 12. This inscription plate can be made of glass with its back surface covered with a suitable paint in which the inscription can be scraped. The glass plate can then be set into the recess 11 with any suitable backing therefor, so that the inscription will stand out prominently from the glass. This plate may be retained by means of putty 13, a portion of which is extended into the grooves 14 formed in the walls of the recess. Obviously various other means can be employed for applying an inscription to the monument.

In use the vase or bowl 8 is filled with dirt and when water is supplied thereto the surplus moisture will drain downwardly through the pipe 9 and onto that portion of the ground surrounded by the foundation 1. Here it will be absorbed but the evaporation from the ground will always be upwardly into the hollow blocks. Consequently should the soil within the bowl or vase become dry, through lack of water supplied thereto, the moisture-laden air confined within the hollow blocks and within the pipe 9 will serve to take moisture to the soil in the bowl and thus prevent the dirt from drying out. Consequently any vegetation growing in the bowl will be kept alive.

What is claimed is:—

A monument including a foundation extending below the level of the ground and surrounding a portion of the ground which communicates with adjacent portions of the ground solely at the bottom of said surrounded portion, said foundation extending to a point sufficiently deep in the ground to retain the moisture in the inclosed soil, a hollow structure open at the bottom and supported on the foundation, said structure providing an elongated upwardly extending compartment closed at the bottom by the surrounded portion of the ground and closed at the top, a dirt container mounted on the hollow structure, and a pipe extending downwardly and opening through the bottom of the container; said pipe being supported within the elongated compartment and opening thereinto close to the bottom thereof, said pipe constituting means for trapping dank air within the upper portion of the compartment and providing the sole outlet for said air from the compartment to the contents of the container thereby to supply moisture to said contents.

In testimony that I claim the foregoing as my own, I have hereto affixed my signature.

CHARLES C. CROSSLEY.